Figure 1:
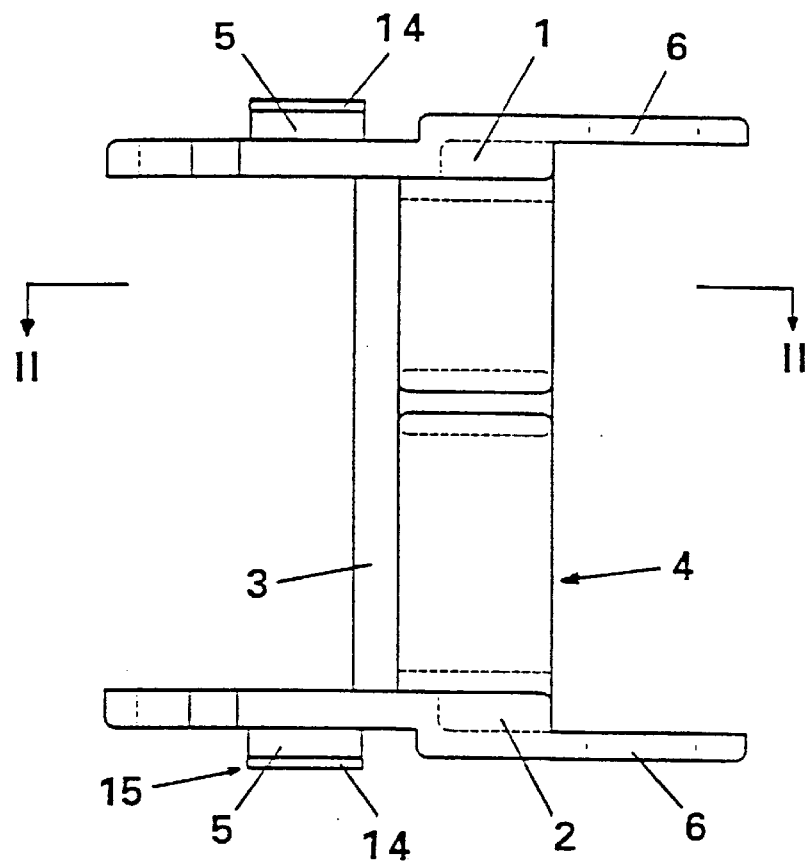

United States Patent [19]
Blase

[11] Patent Number: 5,890,357
[45] Date of Patent: Apr. 6, 1999

[54] CHAIN-TYPE CASING

[75] Inventor: Günter Blase, Bergisch Gladbach, Germany

[73] Assignee: Igus Spritzgubteile Für Die Industrie GmbH, Cologne, Germany

[21] Appl. No.: 945,400
[22] PCT Filed: Apr. 3, 1996
[86] PCT No.: PCT/DE96/00588
  § 371 Date: Jan. 30, 1998
  § 102(e) Date: Jan. 30, 1998
[87] PCT Pub. No.: WO96/31711
  PCT Pub. Date: Oct. 10, 1996

[30] Foreign Application Priority Data

Apr. 3, 1995 [DE] Germany .................. 195 12 088.4

[51] Int. Cl.⁶ .................................................. F16G 13/00
[52] U.S. Cl. ........................................ 59/78.1; 248/51
[58] Field of Search ................ 59/78, 78.1; 248/49, 248/51

[56] References Cited

U.S. PATENT DOCUMENTS

| | | | |
|---|---|---|---|
| 3,197,954 | 8/1965 | Merker et al. | 59/78.1 |
| 3,473,769 | 10/1969 | James | 59/78.1 |
| 3,782,670 | 1/1974 | Kielma . | |
| 4,590,961 | 5/1986 | Schumann | 59/78.1 |
| 4,625,507 | 12/1986 | Moritz | 59/78.1 |
| 4,833,876 | 5/1989 | Kitao et al. . | |
| 4,858,424 | 8/1989 | Loding et al. . | |

FOREIGN PATENT DOCUMENTS

| | | |
|---|---|---|
| 0154882 | 9/1985 | European Pat. Off. . |
| 0286442 | 10/1988 | European Pat. Off. . |
| 3619049 | 4/1987 | Germany . |

Primary Examiner—David Jones
Attorney, Agent, or Firm—Browdy and Neimark

[57] ABSTRACT

The invention concerns a chain-type casing for guiding hoses, cables, etc., between a fixed and a mobile connection point, the links in the chain being of a lightweight, thin-walled design and each consisting of two sideplates (1, 2) joined by at least one crossbar (3). The sideplates (1 or 2) of neighbouring links are hinged to each other by studs (5) formed on each of the sideplates of one link, the studs engaging in matching apertures (6) in the sideplates of the other link and the casing having a construction which allows it to flex torsionally and/or laterally. In order to avoid the hinge connectors between the links opening, the invention calls for the studs (5) to have a snap-in arrester feature round the edge so that the stud (5) locks into the aperture (6) but can be pulled out again by force.

10 Claims, 4 Drawing Sheets

CHAIN-TYPE CASING

The invention relates to an energy chain for guiding hoses, cables and the like between a fixed and a moveable connection point, whose chain links are of a lightweight, thin-walled design, each consisting of two chain straps and at least one cross-member connecting them, where the chain straps of adjacent chain links are joined in pivoting fashion by pegs integrally moulded on the straps of one chain link which reach through corresponding openings in the straps of the other chain link, and where the energy chain is designed to be torsionally elastic and/or flexurally elastic in the lateral direction, elastic deformation of the corresponding strap areas being necessary to insert the pegs of one chain link into the openings in the adjacent chain link.

An energy chain of this kind is suitable for easy and flexible guidance of the hoses, cables and the like of low weight located therein and, having short pitch lengths, permits an almost circular course of the mutually angled chain links. A torsionally elastic and/or laterally flexurally elastic design is present in the case of open or semi-open chains or chains with discontinuous or openable cross-members, in particular. The chain links, whose chain straps are usually of cranked design and are positioned symmetrically opposite each other, where outward-pointing pegs are integrally moulded on the outside of the inward-cranked area and the openings matching the pegs are located in the outward-cranked area, can easily be joined to each other in pivoting fashion. To this end, the corresponding strap areas are elastically deformed in such a way that the pegs of one chain link can latch into the openings in the adjacent chain link.

Although no drawbacks are to be expected as a result of the design described, it has been found that the snap-in connections between the pegs and openings in the chain straps can come apart when the energy chain is exposed to certain load conditions. The applicant thus set himself the task of finding a simple means for preventing separation of the pivoting joint between the chain links of the energy chain mentioned at the start.

Such an energy chain is known from the Patent Abstracts of Japan, Vol. 9, No. 124 (M-383 60-8643 A), for example. The chain links described in this publication are such that their straps are firmly connected by stable lower cross-members. The cross-members are integrally moulded as a single piece, meaning that, in order to connect adjacent chain links, it is necessary to press the inward-cranked areas of one strap slightly inwards using the outward-pointing pegs, while simultaneously bending apart the outward-cranked areas of the straps of the adjacent chain link, which are provided with holes, so that the pegs of one chain link can latch into the openings in the adjacent chain link.

An energy chain is known from EP 0 286 442, whose chain links display hollow pegs pointing inwards, which in turn display snap-in elements around their circumference, with which these engage corresponding openings in locking fashion. The energy chain described there consists of links, which are in turn made up of two straps and two cross-members fastened in detachable fashion. The strap strands of the energy chain are held together reliably by the upper and lower cross-members, the hollow pegs provided with snep-in elements serve exclusively to pre-assemble the strap strands and the ultimate coherence of the chain is ensured by the attached upper and lower cross-members. A chain pursuant to the characterising section of claim 1 is not described in EP 0 286 442.

Similar designs are known from GE.A.1 431 382 and EP.A-0 154 882, for example. These examples are not torsionally elastic and/or flexurally elastic designs, which necessitate elastic deformation of the strap areas when connecting the individual chain links.

The invention is thus based on the task of finding a simple means for preventing separation of the pivoting joint between the chain links of the energy chain pursuant to the characterising section of Claim 1.

According to the invention, the task is solved in that, as an additional safeguard against unintentional separation when the chain is placed under stress, the pegs display snap-in elements around their circumference, with which the pegs engage the openings in locking fashion and which can be released from the openings by applying a certain (i.e. predetermined) force.

It has been found that the additional snap-in connection between the pegs and the openings in accordance with the invention ensures an optimum hold of the pivoting joints between the chain links, even when exposed to comparatively high loads. The following technical relationships come into play in this context. The pegs and the walls of the openings of the pivoting joints are exposed to high tensile and compressive forces, particularly if there is a relatively long, freely suspended upper strand with corresponding weights, as well as during rapid traversing of such energy chains with corresponding forces of inertia. Even the slightest deviations of the position of the contiguous surfaces of the chain straps from a position exactly parallel to the direction of force induce a force component perpendicular to the straps which causes spreading of the straps in the region of the pivoting joints. Even slight spreading causes the spreading forces to rise in a non-linear manner to such an extent that they would easily overcome the snap-in joints between the pegs and openings. Surprisingly, however, it has been found that the snap-in elements provided on the circumference of the pegs in accordance with the invention are capable of preventing the development of spreading forces, even in the initial phase, or of keeping them to such a low level that the pivoting joints cannot come apart. A decisive contribution to this situation is made by the fact that the snap-in elements on the circumference of the pegs force the chain straps into precise linear alignment. As the plastic components take on a form imposed upon them, the solution according to the invention leads to parallel alignment of all contiguous parts of the chain straps, meaning that the development of transverse forces upon exposure of the energy chain to tensile or compressive stresses can be largely avoided.

In a preferred embodiment of the invention, the straps opposite to each other in the joint area make contact with each other without axial clearance. In particular, provision can be made for the snap-in elements on the circumference of the pegs to press together the contiguous straps in the joint area under slight pretension. This further improves the parallel alignment of the contiguous chain straps owing to the form imposed upon them.

The snap-in elements provided on the pegs are preferably designed as racial projections located on the free ends of the pegs. These car take the form of all-round wider areas. These wider areas preferably have a bellied surface extending from a cylindrical part of the peg.

In this embodiment of the pegs, the outer ends of the openings preferably display extensions into which the radial projections located on the free ends of the pegs reach. This achieves a state where the face end of the pegs is essentially in flush alignment with the outer side of the straps, this resulting in a largely smooth overall outer surface of the strap strand.

On the other hand, the snap-in elements provided on the pegs can, for example, be designed as all-round grooves into which corresponding annular projections in the openings reach. This snap-in connection can also be designed in such a way that the face end of the pegs is aligned flush with the outer side of the straps.

The invention is particularly suitable for chains whose chain links display an upper and lower cross-member, with one of these cross-members being discontinuous in order to facilitate insertion of the hoses, cables and the like. Owing to the discontinuous cross-members, the straps of the chain links tend to be forced apart when exposed to tensile or compressive stresses, this being avoided by snap-in elements located on the circumference of the pegs. As a result, a sufficient hold of the pivoting joint is achieved in the event of exposure to substantial stresses, particularly if the two elements of the discontinuous cross-member lie on the same level and are separated by a narrow gap. On the other hand, the end of one element of the discontinuous cross-member which faces the other element can have a downward step which reaches under the opposite end of the other element. In a third example, the two elements of the discontinuous cross-member can lie at different levels, their ends thus being located one above the other.

In order to improve the hold of the pivoting joint of chain links with discontinuous cross-members even further, two different materials can be used to manufacture the chain straps and the continuous cross-member joining them, on the one hand, and the discontinuous cross-member, on the other. While the cain straps and the continuous cross-member consist of a relatively rigid material, the discontinuous cross-member can be made of a relatively flexible, resilient material. In this way, despite the flexible, resilient cross-member for easy insertion of the hoses, cables or the like, the chain link still has sufficient stability, owing to the relatively rigid material, which, in conjunction with the radial snap-in projections provided on the pegs, guarantees that the pivoting joints hold reliably.

Figure 2:
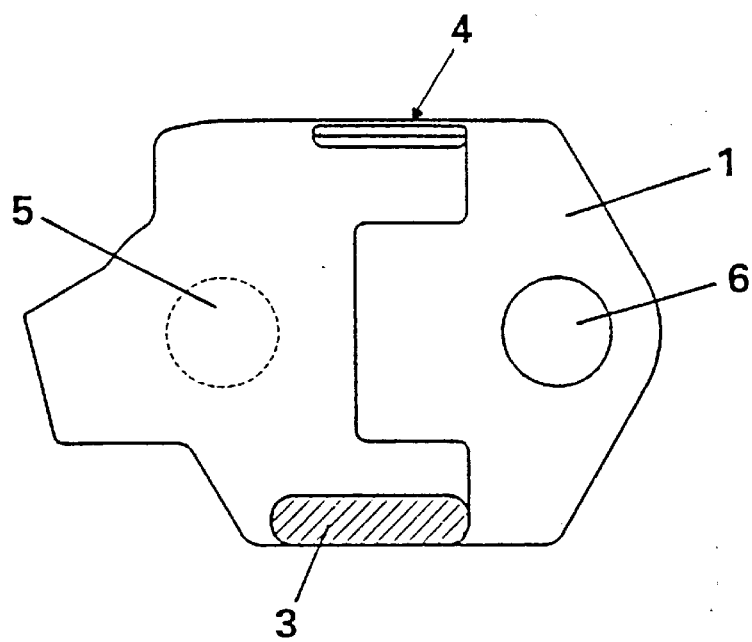
Figure 3:
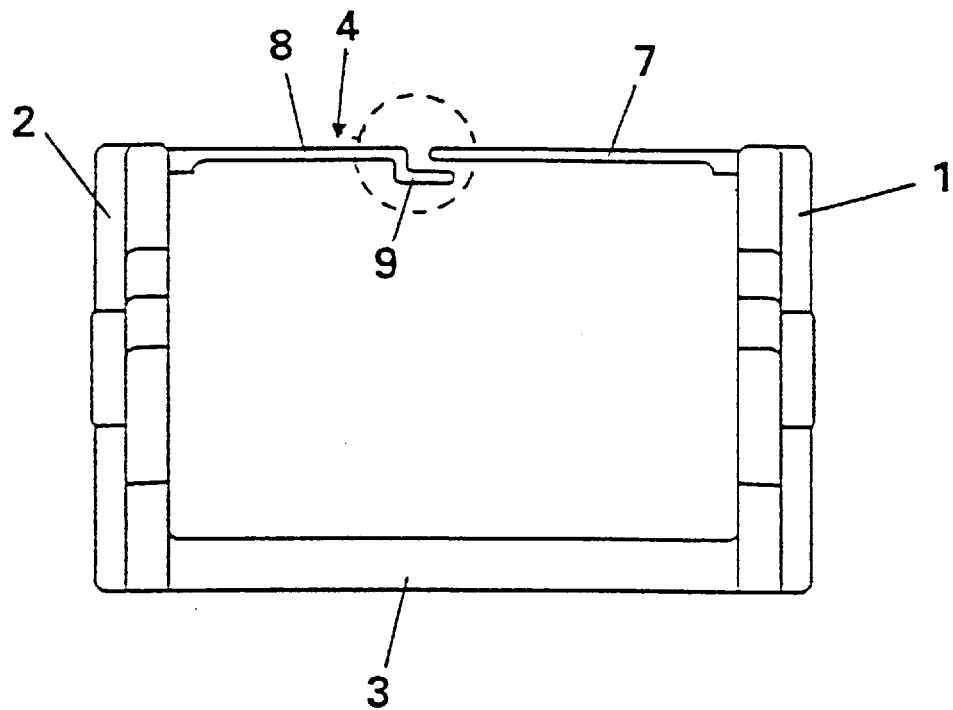
Figure 4:
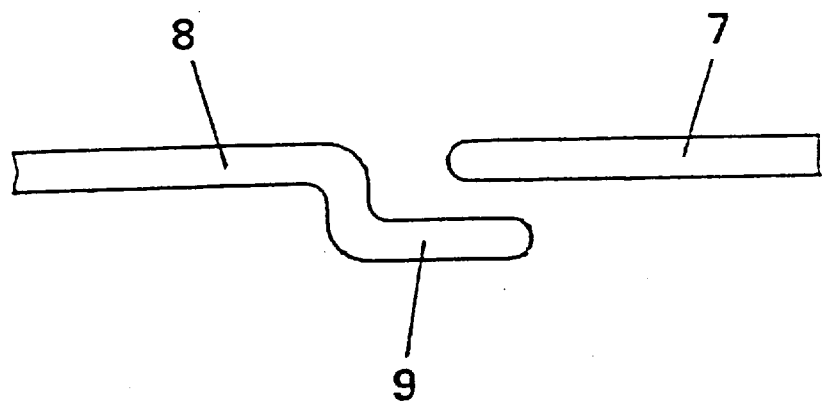
Figure 5:
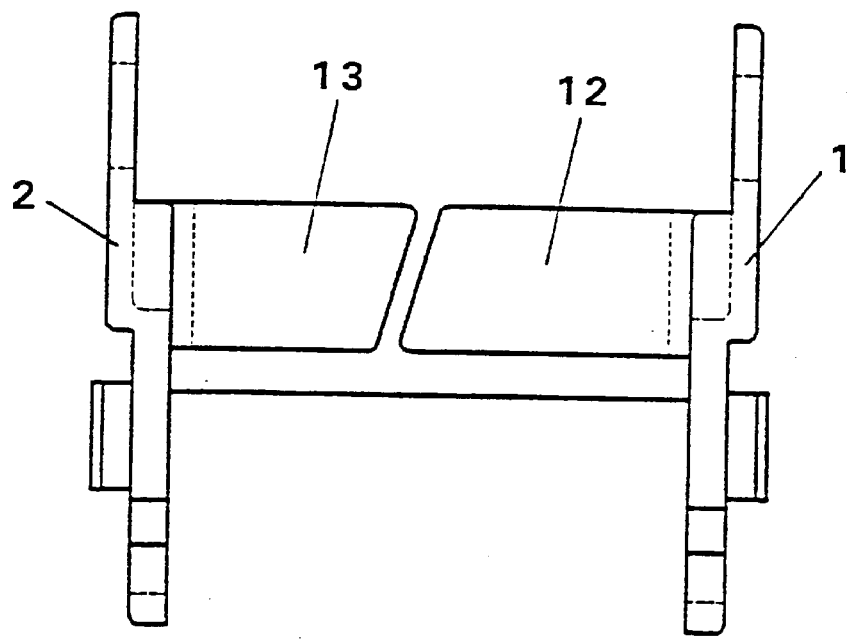
Figure 6:
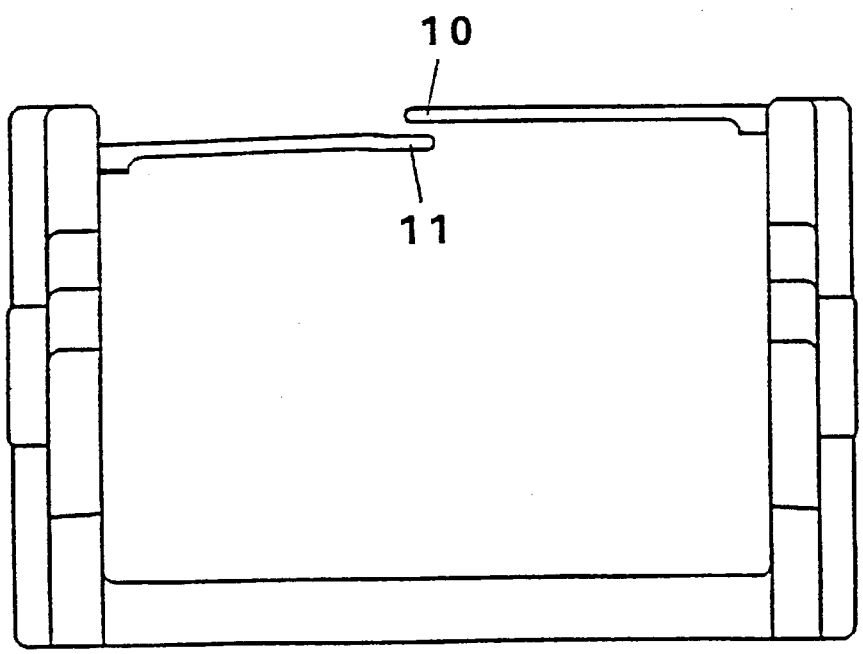
Figure 7:
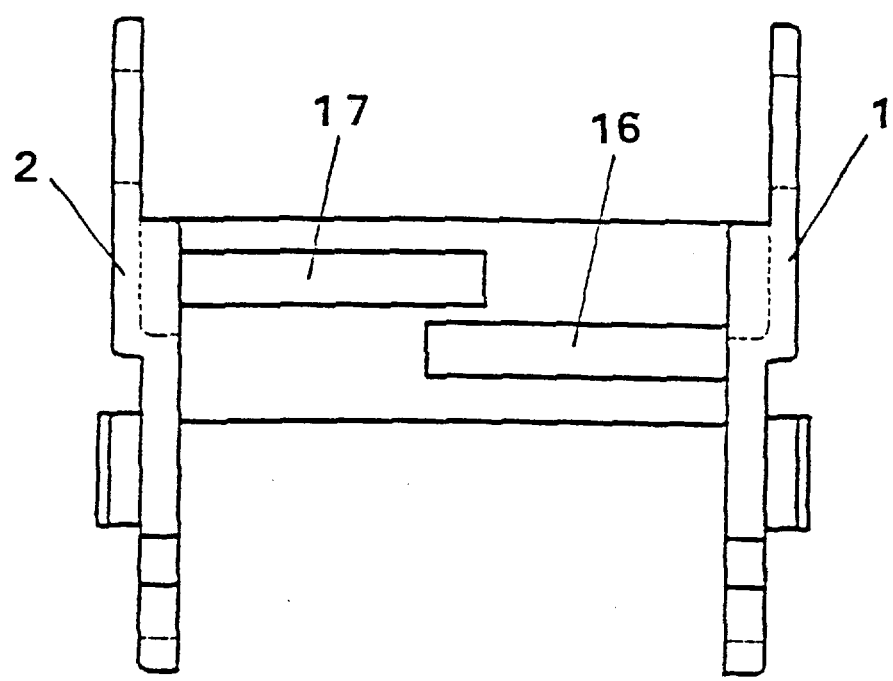

An example of the invention is illustrated in the drawings and described in more detail below on the basis of the drawings. The drawings show the following:

FIG. 1 A top view of the chain link,

FIG. 2 A longitudinal cross-section along Line II—II in FIG. 1,

FIG. 3 A face-end view of the chain link shown in FIG. 1,

FIG. 4 An enlarged representation of the area of the upper cross-member marked by a circle in FIG. 3, FIG. 5 A top view of the gap area of another embodiment of the upper cross-member, FIG. 6 A face-end view of another practical example of the discontinuous cross-member of a chain link and FIG. 7 A top view of the gap area of another embodiment of the upper cross-member.

The chain link of an energy chain illustrated in FIGS. 1 to 3 essentially comprises two chain straps 1 and 2, together with a lower cross-member 3, joining the two chain straps 1 and 2, and an upper cross-member 4.

In the practical example of a chain link under consideration, chain links 1 and 2 are of cranked design, where outward-facing pegs 5 are integrally moulded on the outer side of the inward-cranked area (shown on the left in FIGS. 1 and 2), these reaching through corresponding openings 6 in the outward-cranked area (shown on the right in FIGS. 1 and 2) of an adjacent chain link and thus establishing a pivoting connection between the adjacent chain links of the energy chain.

As can be seen in detail in FIGS. 1 to 4, the upper cross-member 4 has a discontinuity in the middle region. This makes it possible to press in the two cross-member elements 7 and 8 from above when inserting hoses, cables or other lines into the chain links. Owing to the relatively low thickness of cross-member elements 7 and 8, and the flexible material of which they are made, cross-member elements 7 and 8 give relatively easily when pressed in, thus clearing sufficient space for insertion of the lines. Following insertion, cross-member elements 7 and 8 spring back into the closed position illustrated in FIG. 3.

In the practical example illustrated in FIGS. 1 to 4, the cross-member elements 7 and 8 lie essentially on the same level. At the end opposite cross-member element 7, cross-member element 8 has a downward step 9 which reaches under the opposite end of cross-member element 7. As a result, the space accommodating the lines is also closed off over its entire width on the top side.

This closure can also be achieved by the two cross-member elements 10 and 11 of the discontinuous cross-member being located at different levels on cheeks 1 and 2, as illustrated in FIG. 6, so that the opposite ends of the two cross-member elements 10 and 11 are located one above the other.

In the practical examples illustrated in FIGS. 1 to 4 and 6, the gap between the two cross-member elements 7 and 8 or 10 and 11 runs in the longitudinal direction of the chain.

On the other hand, it may be advantageous for the gap to be inclined in relation to the longitudinal direction of the chain, as illustrated in FIG. 5. The two cross-member elements 12 and 13 extend towards each other with mutually opposed pointed ends which give more easily when pressed in.

Furthermore, it can be advantageous to locate the cross-member elements in laterally staggered positions relative to each other, as in the case of the cross-member elements 16 and 17 illustrated in FIG. 7.

In order to prevent the chain links, which are relatively elastic owing to the discontinuous cross-members 4, from disengaging from their pivoting joints when straps 1 and 2 are exposed to flexural and/or torsional stress, pegs 5 have all-round wider areas 14 on their free ends, the largest diameter of which is greater than that of the openings 6. The wider areas 14 are designed in such a way that the pegs 5 reach through the openings 6 in snap-in fashion and can be released from these again by applying a certain force. The wider area 14 has a bellied surface 15, extending from the cylindrical part of the peg 5, for the purpose of making and breaking the snap-fit connection. That is, the wider area 14, as compared to the cylindrical part of the peg 15, is toroidal convex.

LIST OF REFERENCE NUMBERS

1 Chain strap
2 Chain strap
3 Lower cross-member
4 Upper cross-member
5 Peg
6 Opening
7 Cross-member element
8 Cross-member element
9 Downward step
10 Cross-member element
11 Cross-member element
12 Cross-member element
13 Cross-member element
14 Wider area 15 Bellied surface
16 Cross-member element
17 Cross-member element

I claim:

1. An energy chain for guiding hoses, or cables between a fixed and a movable connection point, comprising:

lightweight, thin-walled chain links each including two chain straps (1, 2) and at least one cross-member (3, 4) connecting them, where the chain straps (1, 2) of adjacent chain links are joined, at a joint area, in pivoting fashion by pegs (5) integrally moulded on the straps of a first chain link which reach through corresponding openings (6) in the straps of an adjacent second chain link, and wherein, the energy chain being torsionally elastic or flexurally elastic in a lateral direction, elastic deformation of the corresponding straps is necessary to insert the pegs of the first chain link into the openings in the adjacent second chain link, where, as an additional safeguard against unintentional separation when the chain is placed under a stress, the pegs (5) include snap-in elements around respective circumferences thereof, with which the pegs (5) engage the opening (6) in locking fashion and are releasable from the openings (6) by applying a predetermined force.

2. The energy chain as per claim 1, wherein straps (1 and 2) opposite to each other in the joint area make contact with each other without axial clearance.

3. The energy chain as per claim 2, wherein the snap-in elements on the circumference of the pegs (5) comprise means to press together the contiguous straps (1 and 2) in the joint area under slight pretension.

4. The energy chain as per claim 1, wherein the snap-in elements provided on the pegs (5) include annular wider areas (14) on free ends of the pegs (5).

5. The energy chain as per claim 4, wherein the wider areas (14) display a toroidal convex surface (15), extending from a cylindrical part of the peg (5).

6. The energy chain as per claim 4, wherein outer ends of the openings (6) include extensions into which the wider areas (14) on the free ends of the pegs reach, with a result that outer faces of the pegs (5) are essentially in flush alignment with outer sides of the straps (1, 2).

7. The energy chain as per claim 1, including a discontinuous cross-member (4), wherein the discontinuous cross-member (4) includes two elements (7, 8) which lie on a same level and are separated from each other by a narrow gap.

8. The energy chain as per claim 7, wherein the end of one element (8) of the discontinuous cross-member (4) which faces the other element (7) includes a step (9) which reaches under the opposite end of the other element.

9. The energy chain as per claim 1, having a discontinuous cross-member (4), wherein two cross-member elements (10, 11) of the discontinuous cross-member lie on different levels on cheeks of the chain straps and their ends are located one above the other.

10. The energy chain as per claim 1, including a discontinuous cross-member (4), wherein the chain straps (1, 2) and a first cross-member (3) connecting them are made of a relatively rigid material and a discontinuous cross-member (4) is made of a relatively flexible, resilient material.

* * * * *